US006992052B2

(12) United States Patent
Song

(10) Patent No.: US 6,992,052 B2
(45) Date of Patent: Jan. 31, 2006

(54) PROCESS OF PREPARING IN-SITU WATER-SOLUBLE ZINC SALT FOR USE IN AUTOMATIC DISHWASHING COMPOSITIONS

(75) Inventor: Brian Xiaoqing Song, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 244 days.

(21) Appl. No.: 10/738,492

(22) Filed: Dec. 17, 2003

(65) Prior Publication Data

US 2004/0176269 A1 Sep. 9, 2004

Related U.S. Application Data

(60) Provisional application No. 60/437,077, filed on Dec. 30, 2002.

(51) Int. Cl.
*C11D 3/12* (2006.01)

(52) U.S. Cl. ....................................... 510/221; 510/508

(58) Field of Classification Search ................ 510/218, 510/219, 220, 221, 508
See application file for complete search history.

(56) References Cited

U.S. PATENT DOCUMENTS

| | | | |
|---|---|---|---|
| 2,575,576 | A | 11/1951 | Bacon et al. |
| 3,255,117 | A | 6/1966 | Knapp et al. |
| 3,350,318 | A | 10/1967 | Green |
| 3,549,316 | A | 12/1970 | Nies et al. |
| 3,677,820 | A | 7/1972 | Rutkowski |
| 3,874,913 | A | 4/1975 | Lofts et al. |
| 4,017,410 | A | 4/1977 | Sorgenfrei et al. |
| 4,443,270 | A | 4/1984 | Biard et al. |
| 4,908,148 | A | 3/1990 | Caravajal et al. |
| 4,917,812 | A | 4/1990 | Cilley |
| 4,933,101 | A | 6/1990 | Cilley et al. |
| 4,992,212 | A | 2/1991 | Corring et al. |
| 5,152,996 | A | 10/1992 | Corey et al. |
| 6,083,894 | A | 7/2000 | Keyes et al. |
| 6,448,210 | B1 | 9/2002 | Keyes et al. |
| 6,482,788 | B1 | 11/2002 | Arvanitidou |
| 6,492,313 | B1 | 12/2002 | Connors et al. |
| 6,495,500 | B1 | 12/2002 | Connors et al. |
| 6,544,940 | B1 | 4/2003 | Arvanitidou |
| 6,680,264 | B2 | 1/2004 | Julemont |

FOREIGN PATENT DOCUMENTS

| | | | | |
|---|---|---|---|---|
| EP | 0 387 997 | A2 | | 9/1990 |
| GB | 2354771 | | * | 4/2001 |
| WO | WO 94/03574 | | | 2/1994 |
| WO | WO 95/21234 | | | 8/1995 |
| WO | WO 95/21238 | A | | 8/1995 |
| WO | WO 00/08125 | | | 2/2000 |
| WO | WO 00/23552 | A | | 4/2000 |
| WO | WO 00/39259 | | | 6/2000 |
| WO | WO 00/56851 | A | | 9/2000 |
| WO | WO 02/068352 | A2 | | 9/2002 |
| WO | WO 2004/061070 | | * | 7/2004 |

* cited by examiner

*Primary Examiner*—John R. Hardee
(74) *Attorney, Agent, or Firm*—Kim W. Zerby; Steven W. Miller; Jeffrey V. Bamber

(57) ABSTRACT

A process for preparing in-situ water-soluble zinc salts for use in automatic dishwashing compositions is disclosed.

21 Claims, No Drawings

PROCESS OF PREPARING IN-SITU WATER-SOLUBLE ZINC SALT FOR USE IN AUTOMATIC DISHWASHING COMPOSITIONS

CROSS REFERENCE TO RELATED APPLICATION

This application claims the benefit of the filing date of U.S. Patent Application No. 60/437,077 filed Dec. 30, 2002, the disclosure of which is incorporated by reference herein.

FIELD OF THE INVENTION

The present invention relates to water-soluble zinc salts and their preparation for use in automatic dishwashing compositions and/or products. More specifically, it relates to preparing in-situ water-soluble zinc salts for use in rinse aid and detergent compositions.

BACKGROUND OF THE INVENTION

Automatic dishwashing compositions which provide glassware protection are well known. The use of water-soluble zinc salts, such as zinc salts of chloride, sulfate or acetate, have been disclosed for this purpose. A water-soluble zinc salt can be employed to prevent the corrosion of ceramic surfaces. Solid plates of slowly dissolving zinc metal alloys can be placed in contact with a detergent composition or low-foaming nonionic surfactant to provide corrosion protection to glassware. In fact, insoluble inorganic zinc compounds can also be employed in conjunction with a surfactant for similar purposes. Though zinc gluconate has been prepared in-situ for use in a liquid dishwashing detergent composition, there remains a need to provide a cost-effective process of preparing in-situ water-soluble zinc salts for use in suitable automatic dishwashing compositions and/or products to help prevent glassware corrosion.

It has surprisingly been found that cost effective water-soluble zinc salts may be prepared in-situ for use in automatic dishwashing compositions and/or products. These water-soluble zinc salts when prepared in-situ and combined to form a rinse aid composition provides protection from glassware corrosion during the rinse cycle and promote consumer satisfaction in automatic dishwashing results.

SUMMARY OF THE INVENTION

The present invention relates to a process for preparing a water-soluble zinc salt in-situ for use as a base or additive in preparing an automatic dishwashing rinse aid composition. The process comprises the steps of: (a) dispersing zinc oxide in water; (b) combining an acid with the zinc oxide/water mixture; (c) mixing the zinc oxide/water mixture and the acid until the zinc oxide is at least partially dissolved; (d) maintaining the zinc oxide/water/acid mixture within an acidic pH range; and (e) combining the zinc oxide/water/acid mixture with at least one rinse aid ingredient to form the rinse aid composition.

The present invention also relates to a process for preparing a water-soluble zinc salt in-situ for use as a base or additive in preparing an automatic dishwashing detergent composition. The process comprises the steps of: (a) dispersing zinc oxide in water; (b) combining an acid with the zinc oxide/water mixture; wherein the acid is selected from the group consisting of acetic acid, aspartic acid, benzoic acid, boric acid, bromic acid, formic acid, glutamic acid, hydrochloric acid, lactic acid, malic acid, nitric acid, sulfamic acid, sulfuric acid, tartaric acid, and mixtures thereof; (c) mixing the zinc oxide/water mixture and the acid until the zinc oxide is at least partially dissolved; and (d) combining the zinc oxide/water/acid mixture with at least one deterrent ingredient to form the detergent composition.

DETAILED DESCRIPTION OF THE INVENTION

The present invention relates to water-soluble zinc salts and their preparation for use in automatic dishwashing compositions and/or products. Automatic dishwashing compositions include, but are not limited to, detergent compositions, rinse aid compositions, and combinations thereof. The preparation of in-situ zinc salt disclosed herein requires zinc oxide to be dispersed in water and combined with an acid. The resulting mixture may be designed to be the base or added as an additive in a process for making or preparing an automatic dishwashing composition and/or product, such as a detergent and/or rinse aid composition.

Water-soluble zinc salts may be prepared in-situ by reacting zinc oxide with an acid according to the general formula:

$$2H_xA+X\ ZnO\rightarrow X\ Zn\ A_{2/x}+X\ H_2O$$

wherein A is an organic and/or an inorganic acid, and x is an integer that varies from 1 to 2. For example, water-soluble zinc nitrate can be prepared in-situ by reacting zinc oxide with nitric acid according to the formula:

$$2\ HNO_3+ZnO\rightarrow Zn(NO_3)_2+H_2O$$

The zinc oxide may be provided in any suitable amount. A suitable amount of zinc oxide is an amount that will deliver via an automatic dishwashing composition and/or product from about 0.01 mM to about 10 mM, alternatively about 0.02 mM to about 5 mM, alternatively about 0.05 mM to about 1 mM, and alternatively about 0.05 mM to about 0.5 mM of a water-soluble zinc salt compound or product to the wash and/or rinse liquor of an automatic dishwashing appliance during operation. Alternatively, a suitable amount of zinc oxide is an amount that will deliver via an automatic dishwashing composition and/or product from about 0.1 ppm to about 60 ppm, alternatively from about 0.1 ppm to about 30 ppm, alternatively from about 0.1 ppm to about 15 ppm, and/or alternatively from about 0.1 ppm to about 10 ppm of a water-soluble zinc salt compound or product to the wash and/or rinse liquor of an automatic dishwashing appliance during operation.

The zinc oxide may be provided in any suitable form. For example, the zinc oxide may be in powder form. The zinc oxide is first dispersed in water. At least a stoichiometric amount according to the above general formula, or alternatively a slight excess, of an acid is added slowly to the dispersion.

The mixture is then stirred continuously until the zinc oxide is at least partially dissolved, and alternatively fully dissolved. The order of addition of the process steps of the in-situ preparation of the zinc oxide/water/acid mixture is not critical. Thus, the process can first start with the addition of the acid, followed by zinc oxide dispersed in water—the later of which is slowly added with continuous stirring until the zinc oxide is fully dissolved or vice versa. Once the zinc oxide is at least partially dissolved, the zinc oxide/water/acid mixture will begin to clear. Once the zinc oxide/water/acid mixture is fully dissolved it will exhibit a clear solution. This completes the in-situ acid neutralization process.

After the in-situ acid neutralization process is completed, any suitable amount of a suitable automatic dishwashing ingredient can be admixed in any order with the zinc oxide/water/acid mixture to make the desired automatic dishwashing composition. Suitable automatic dishwashing ingredients that may be added to the zinc oxide/water/acid mixture to prepare a rinse aid composition and/or product include, but are not limited to: an acid, a hydrotrope, a thickener, a binder, a dispersant polymer, a carrier medium, a surfactant, a perfume, a dye, and mixtures thereof. Suitable automatic dishwashing ingredients that may be added to the zinc oxide/water/acid mixture to prepare a detergent composition and/or product include, but are not limited to: a detergent builder, alkalinity builder, bleach, enzyme, surfactant, defoamer, polymer, bleach activator, and mixtures thereof.

For example, citric acid, sodium cumene sulfonate, Acusol® polymer, ethanol, non-ionic surfactant, perfume, dye, and mixtures thereof may be added sequentially to the zinc oxide/water/acid mixture to make a liquid rinse aid composition and/or product. In another example, a binder or a solid surfactant (e.g. solid at 25° C.) may be added to formulate a solid rinse aid composition. In another example, a detergent builder, an enzyme, surfactant, a defoamer, and mixtures thereof may be added to the zinc oxide/water/acid mixture to formulate a liquid detergent composition. In yet another example, an alkalinity builder, a surfactant, a bleach, a bleach activator, and mixtures thereof may be added to the zinc oxide/water/acid mixture to formulate a solid detergent composition.

Acid

Any suitable organic and/or inorganic acid in any suitable amount may be used to prepare in-situ water-soluble zinc salts for use in automatic dishwashing rinse aid compositions and/or products. Some suitable acids to be used the in-situ water-soluble zinc salt preparation process include, but are not limited to: acetic acid, aspartic acid, benzoic acid, boric acid, bromic acid, formic acid, gluconic acid, glutamic acid, hydrochloric acid, lactic acid, malic acid, nitric acid, sulfamic acid, sulfuric acid, tartaric acid, and mixtures thereof.

Any acid that leads to precipitation of the zinc salt should not be used in the in-situ water-soluble zinc salt preparation process. For example, citric acid leads to precipitation of an insoluble zinc salt. However, as disclosed below, such precipitation acids may be added to the mixture after the in-situ process is completed.

Adding an acid after the in-situ water-soluble zinc salt preparation process, such as in the preparation of an automatic dishwashing composition, enables the water-soluble zinc salt to at least partially dissolve, alternatively to fully dissolve, and alternatively remain dissolved. The acid may act to stabilize the composition against precipitation in the product prior to use. The acid also helps to eliminate precipitation on hard surfaces, such as on flatware, glasses, dishes and/or components inside the automatic dishwashing appliance itself, during the wash and/or rinse cycle.

When preparing in-situ water-soluble zinc salts to be used in solid rinse aid composition, certain non-precipitation acids will not result in precipitation of the water-soluble zinc salt in the rinse aid composition and/or product itself or in rinse liquor of the automatic dishwashing appliance during operation. For example, nitric acid, hydrochloric acid, and mixtures thereof, are typically non-precipitation acids. Conversely, precipitation acids, like phosphoric acid, citric acid, and mixtures thereof, may result in precipitation of an insoluble zinc salt during preparation of in-situ water-soluble zinc salts. For example, a precipitation acid may be added only after the water-soluble zinc salt is at least first partially dissolved, and alternatively fully dissolved, in a non-precipitation acid, such as nitric acid, hydrochloric acid, and mixtures thereof. Furthermore, the dissolved water-soluble zinc salt (i.e. those dissolved in a non-precipitation acid) should have the pH maintained in the acidic pH range prior to adding a subsequent precipitating acid to the mixture in order to prevent insoluble materials from forming in the rinse aid composition and/or product itself, or in the rinse liquor of the automatic dishwashing appliance during the rinse cycle. A suitable amount of acid may be determined stoichimetrically using the formula:

$$2\ H_xA + X\ ZnO \rightarrow X\ Zn\ A_{2/x} + X\ H_2O$$

wherein A is an organic and/or an inorganic acid, and x is an integer that varies from 1 to 2. Suitable acids are typically present in the preparation of in-situ water-soluble zinc salt range from about 0.01% to about 25%, alternatively from about 0.5% to about 20%, and alternatively from about 1% to about 10%, by weight of the mixture.

In one non-limiting embodiment, an acid selected from the group consisting of acetic acid, formic acid, gluconic acid, glutamic acid, hydrochloric acid, malic acid, nitric acid, sulfuric acid, and mixtures thereof, by weight of the mixture may be used in the preparation of in-situ water-soluble zinc salt.

pH

The pH of the zinc oxide/water/acid mixture may be measured directly at the end of the in-situ process. However, when the zinc oxide/water/acid mixture is combined with at least one rinse aid ingredient to form a rinse aid composition, the pH of the rinse aid composition should be measured as a 10% concentration in an aqueous solution.

Suitable pHs range from about 1 to about 5, alternatively from about 1 to about 4, and alternatively from about 1 to about 3. A lower acidic pH range will tend to reduce incompatibility and negative interaction of rinse aid ingredients. A slightly higher acidic pH range will allow for some flexibility in product formulation.

Zinc Salts Prepared Using In-situ Process

Any suitable water-soluble salt of zinc in any suitable amount may be prepared in-situ by reacting zinc oxide with an inorganic and/or organic acid. In-situ water-soluble zinc salts suitable for use in automatic dishwashing can be prepared for use in liquid compositions and/or products, solid compositions and/or products, and mixtures thereof.

Water-soluble zinc salts that may be prepared in-situ include, but are not limited to: zinc acetate, zinc benzoate, zinc borate, zinc bromide, zinc chloride, zinc formate, zinc gluconate, zinc lactate, zinc laurate, zinc malate, zinc nitrate, zinc perborate, zinc sulfate, zinc sulfamate, zinc tartrate, and mixtures thereof.

The in-situ water-soluble zinc salt prepared by this process may exist in any physical form, including, but not limited to, liquid, solid, and combinations thereof. The in-situ water-soluble zinc salt may be combined with automatic dishwashing ingredients to form an automatic dishwashing composition which may also exist in any physical form, including, but not limited to, liquid, solid, and combinations thereof.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification would include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed is:

1. A process for preparing an in-situ water-soluble zinc salt for use as a base or additive in preparing an automatic dishwashing composition, said process comprising the steps of:

a) dispersing zinc oxide in water;

b) combining an acid with said zinc oxide/water mixture;

c) mixing said zinc oxide/water mixture and said acid until said zinc oxide is at least partially dissolved;

d) maintaining said zinc oxide/water/acid mixture within an acidic pH range; and e) combining said zinc oxide/water/acid mixture with at least one rinse aid ingredient to form a rinse aid composition;

wherein the order of addition of said process steps (a) and (b) is not critical.

2. A process according to claim 1, wherein said zinc oxide/water/acid mixture has a pH of less than about 5.

3. A process according to claim 1, wherein zinc oxide is provided in an amount that will deliver via an automatic dishwashing composition and/or product from about 0.01 mM to about 10 mM of a water-soluble zinc salt compound or product to the wash and/or rinse liquor of an automatic dishwashing appliance during operation.

4. A process according to claim 3, wherein from about 0.02 mM to about 5 mM of said water-soluble zinc salt compound or product is delivered.

5. A process according to claim 4, wherein from about 0.05 mM to about 1 mM of said water-soluble zinc salt compound or product is delivered.

6. A process according to claim 5, wherein from about 0.05 mM to about 0.5 mM of said water-soluble zinc salt compound or product is delivered.

7. A process according to claim 1, wherein said acid is provided at least in an amount determined stoichimetrically using the formula:

$$2H_xA + X\ ZnO \rightarrow X\ Zn\ A_{2/x} + X\ H_2O$$

wherein A is an organic and/or an inorganic acid, and x is an integer that varies from 1 to 2.

8. A process according to claim 1, wherein said acid is selected from the group consisting of acetic acid, aspartic acid, benzoic acid, boric acid, bromic acid, formic acid, gluconic acid, glutamic acid, hydrochloric acid, lactic acid, malic acid, nitric acid, sulfamic acid, sulfuric acid, tartaric acid, and mixtures thereof.

9. A process according to claim 1, wherein said acid is acetic acid.

10. A process according to claim 1, wherein said acid is gluconic acid.

11. A process according to claim 1, wherein said acid is hydrochloric acid.

12. A process according to claim 1, wherein said acid is nitric acid.

13. A process according to claim 1, wherein a water-soluble zinc salt is prepared in-situ, wherein said salt is selected from the group consisting of zinc acetate, zinc benzoate, zinc borate, zinc bromide, zinc chloride, zinc formate, zinc gluconate, zinc lactate, zinc laurate, zinc malate, zinc nitrate, zinc perborate, zinc sulfate, zinc sulfamate, zinc tartrate, and mixtures thereof.

14. A process according to claim 1, wherein said in-situ prepared water-soluble salt is zinc acetate.

15. A process according to claim 1, wherein said in-situ prepared water-soluble salt is zinc gluconate.

16. A process according to claim 1, wherein said in-situ prepared water-soluble salt is zinc chloride.

17. A process according to claim 1, wherein said in-situ prepared water-soluble salt is zinc nitrate.

18. A process according to claim 1, wherein said at least one rinse aid ingredient is selected from the group consisting of an acid, a hydrotrope, a thickener, a binder, a dispersant polymer, a carrier medium, a surfactant, a perfume, a dye, and mixtures thereof.

19. A process for preparing an in-situ water-soluble zinc salt for use as a base or additive in preparing an automatic dishwashing composition, said process comprising the steps of:

a) dispersing zinc oxide in water;

b) combining an acid with said zinc oxide/water mixture; wherein said acid is selected from the group consisting of acetic acid, aspartic acid, benzoic acid, boric acid, bromic acid, formic acid, glutamic acid, hydrochloric acid, lactic acid, malic acid, nitric acid, sulfamic acid, sulfuric acid, tartaric acid, and mixtures thereof;

c) mixing said zinc oxide/water mixture and said acid until said zinc oxide is at least partially dissolved; and d) combining said zinc oxide/water/acid mixture with at least one detergent ingredient to form a detergent composition.

20. A process according to claim 19, wherein said acid is provided at least in an amount determined stoichimetrically using the formula:

$$2H_xA + X\ ZnO \rightarrow X\ Zn\ A_{2/x} + X\ H_2O$$

wherein A is an organic and/or an inorganic acid, and x is an integer that varies from 1 to 2.

21. A process according to claim 19 wherein said at least one detergent ingredient is selected from the group consisting of a detergent builder, alkalinity builder, bleach, enzyme, surfactant, defoamer, polymerand mixtures thereof.

* * * * *